(12) United States Patent
Qiu et al.

(10) Patent No.: US 12,098,058 B2
(45) Date of Patent: Sep. 24, 2024

(54) FIXTURE AUTOMATED CONFIGURING METHOD, FIXTURE, AND ELEVATOR

(71) Applicant: Otis Elevator Company, Farmington, CT (US)

(72) Inventors: Heping Qiu, Shanghai (CN); Tan Liu, Shanghai (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 1398 days.

(21) Appl. No.: 16/585,954

(22) Filed: Sep. 27, 2019

(65) Prior Publication Data
US 2020/0102189 A1    Apr. 2, 2020

(30) Foreign Application Priority Data
Sep. 28, 2018  (CN) .......................... 201811137744.2

(51) Int. Cl.
*B66B 5/00* (2006.01)
*B66B 1/34* (2006.01)
(Continued)

(52) U.S. Cl.
CPC .......... *B66B 5/0037* (2013.01); *B66B 1/3423* (2013.01); *B66B 1/468* (2013.01);
(Continued)

(58) Field of Classification Search
CPC .. B66B 1/468; B66B 3/00; B66B 1/34; B66B 1/3461; B66B 1/3415; B66B 1/2408;
(Continued)

(56) References Cited

U.S. PATENT DOCUMENTS 4,497,391 A * 2/1985 Mendelsohn ........... B66B 1/468
                                                      187/380
4,568,909 A   2/1986 Whynacht
(Continued)

FOREIGN PATENT DOCUMENTS

CN    101549812 A   10/2009
CN    101823657 B    7/2012
(Continued)

OTHER PUBLICATIONS

Chinese Office Action for Application No. 201811137744.2; Issued Jun. 1, 2022; 8 Pages.
(Continued)

*Primary Examiner* — Marlon T Fletcher
(74) *Attorney, Agent, or Firm* — CANTOR COLBURN LLP

(57) ABSTRACT

An automatic configuration method of fixture and a fixture. The automatic configuration method of fixture includes: S1: sending, by a fixture, a predetermined request toward a predetermined address to an elevator controller; S2: judging a control function corresponding to the predetermined address; and S3: configuring the fixture according to the control function corresponding to the predetermined address. The automatic configuration method of fixture and the fixture of the present invention have the advantages of being simple, reliable, convenient to maintain and the like, and can automatically configure the fixture during installation and maintenance, effectively improving the user experience.

17 Claims, 1 Drawing Sheet

(51) Int. Cl.
*B66B 1/46* (2006.01)
*B66B 3/02* (2006.01)
*G05B 19/042* (2006.01)

(52) U.S. Cl.
CPC .............. *B66B 3/02* (2013.01); *B66B 5/0025* (2013.01); *G05B 19/0423* (2013.01); *B66B 2201/10* (2013.01)

(58) Field of Classification Search
CPC . B66B 2201/463; B66B 3/002; B66B 5/0025; B66B 2201/4638; B66B 2201/102; B66B 5/0031; B66B 5/00; B66B 1/3446; B66B 1/3423; B66B 1/06; B66B 1/3453; B66B 1/00; B66B 1/52; B66B 13/14; B66B 2201/4607
See application file for complete search history.

(56) References Cited

U.S. PATENT DOCUMENTS

| | | | |
|---|---|---|---|
| 4,683,989 A * | 8/1987 | Pillage | B66B 1/468 187/391 |
| 5,787,020 A | 7/1998 | Molliere et al. | |
| 5,952,626 A * | 9/1999 | Zaharia | B66B 1/468 187/395 |
| 6,427,807 B1 | 8/2002 | Henneau | |
| 7,412,530 B1 * | 8/2008 | Wehrle | G05B 19/0423 710/10 |
| 2005/0194217 A1 * | 9/2005 | Smith | B66B 1/34 187/247 |
| 2011/0120808 A1 | 5/2011 | Fang et al. | |
| 2018/0118511 A1 * | 5/2018 | Baldi | G06F 3/0485 |
| 2020/0102189 A1 * | 4/2020 | Qiu | B66B 5/0025 |

FOREIGN PATENT DOCUMENTS

| | | | | |
|---|---|---|---|---|
| CN | 102689825 B | | 3/2016 | |
| CN | 105936452 A | | 9/2016 | |
| CN | 107967229 A | | 4/2018 | |
| EP | 3015412 A1 | | 5/2016 | |
| EP | 3381852 A2 * | | 10/2018 | ............... B66B 1/16 |
| WO | 2009010481 A1 | | 1/2009 | |
| WO | WO-2009078838 A1 * | | 6/2009 | ............... B66B 1/34 |
| WO | WO-2010024815 A1 * | | 3/2010 | ............... B66B 1/34 |
| WO | 2016202644 A1 | | 12/2016 | |
| WO | 2017016937 A1 | | 2/2017 | |

OTHER PUBLICATIONS

European Search Report for application EP 19200573.4, dated Mar. 18, 2020, 8 pages.

* cited by examiner

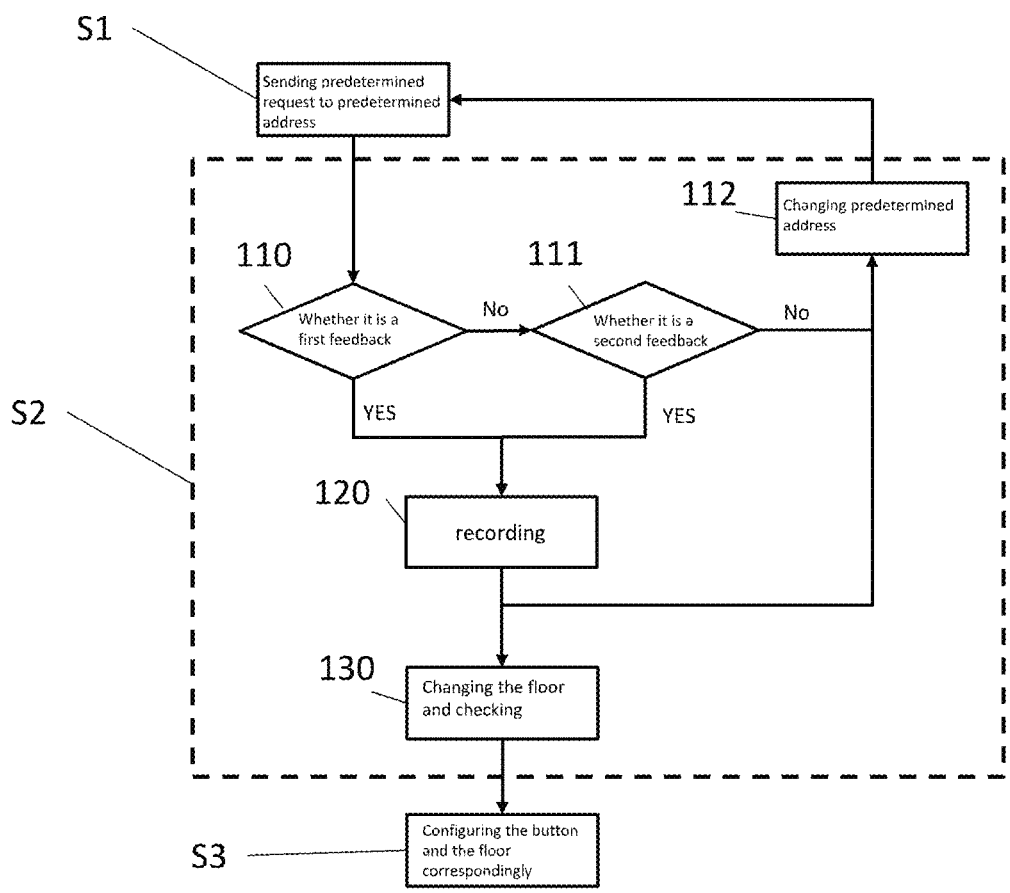

FIXTURE AUTOMATED CONFIGURING METHOD, FIXTURE, AND ELEVATOR

CROSS-REFERENCE TO RELATED APPLICATION

This application claims priority of Chinese patent application No. 201811137744.2, filed on Sep. 28, 2018, the entirety of which is hereby incorporated by reference herein.

TECHNICAL FIELD

The present invention relates to the field of elevator control devices and, more particularly, to an automatic configuration method of fixture for automatically configuring a correspondence between a fixture and a controller. The present invention further relates to a fixture for implementing the aforementioned automatic configuration method of the fixture and an elevator comprising the aforementioned fixture.

BACKGROUND ART

It is known that a fixture is generally provided in an elevator car or hall, for example, integrated in a button board or display of a car. The fixture is, for example, a bus terminal device, which includes, but is not limited to, an address communication board, a transfer board, a button board, a display board, and the like, all of which are devices utilizing an address as the identification mark. These fixtures communicate with the elevator controller through communication lines to send and receive various control signals. Communication lines generally follow a certain communication protocol. In some known communication protocols, the control signals are related to the physical structure of the communication lines. For example, several pins on the serial bus are configured for indicating the data of elevator call.

When an elevator is installed or maintained, the fixture is likely to be replaced and reconfigured. Since different elevators may correspond to buildings of different structures, existing fixtures require a user to manually change the configuration, so as to coincide with the configuration of the elevator controller. However, such operations generally require specialized knowledge and relatively complex operation procedure, and generally need to be operated by a professional technician.

Accordingly, there is a continuing need for a solution of an improved automatic configuration method of fixture. It is desirable that the solution be able to mitigate the aforementioned problems at least to a certain degree.

SUMMARY OF THE INVENTION

One object of the present invention is to provide an automatic configuration method of a fixture that enables automatic configuration of a fixture. Another object of the present invention is to provide a fixture for performing the aforementioned automatic configuration method of fixture, and an elevator comprising the aforementioned fixture.

The object of the present invention is realized by the following technical solution: An automatic configuration method of fixture for an elevator, comprising the steps of: S1: sending, by a fixture, a predetermined request toward a predetermined address to an elevator controller; S2: judging a control function corresponding to the predetermined address; and S3: configuring the fixture according to the control function corresponding to the predetermined address.

Optionally, in step S2, a control function corresponding to the predetermined address is judged according to feedback provided by the elevator controller.

Optionally, the predetermined request is sent to a portion or all of addresses within a predetermined address range successively, and whether each address corresponds to a call button interface is judged according to the feedback provided by the elevator controller.

Optionally, the feedback provided by the elevator controller includes a first feedback, wherein the first feedback is a first electrical level and is kept over a predetermined time.

Optionally, when the feedback provided by the elevator controller is the first feedback, the control function corresponding to the predetermined address is judged to be a call button interface.

Optionally, the feedback provided by the elevator controller further comprises a second feedback, wherein the second feedback is a transition from the first electrical level to a second electrical level within a predetermined time.

Optionally, when the feedback provided by the elevator controller is the second feedback, the control function corresponding to the predetermined address is judged to be a call button interface of a floor where the car is currently located.

Optionally, it further comprises a checking step, the checking step comprises: predicting a second address corresponding to a second floor; moving the car to the second floor and sending the predetermined request to the elevator controller at the second address; and judging whether the feedback of the elevator controller is the second feedback.

Optionally, the second address is predicted according to the following steps: establishing a correspondence between the address and the floor; locating the first address corresponding to the first floor; and predicting the second address according to a difference between the floor numbers of the first floor and the second floor.

Optionally, the fixture is of physical IO type.

Optionally, in step S3, the physical buttons of the fixture are bound from lower floor to higher floor to addresses judged as call button interfaces from lower bit to higher bit, respectively.

Optionally, the fixture is of non-physical IO type.

Optionally, it further comprises: when the feedback provided by the elevator controller is the second feedback, judging the floor number of the first floor by detecting the floor indication information, and judging the floor number of the floor corresponding to other addresses.

Optionally, in step S3, virtual buttons are generated, wherein each virtual button is bound to an address judged as a call button interface respectively, and the virtual button is configured to display the floor number of each floor.

Optionally, the predetermined request comprises a floor request signal

Optionally, the fixture is connected to the elevator controller through a serial bus.

Optionally, the predetermined time is no less than 2 seconds.

Optionally, the predetermined address range comprises at least 64 addresses.

Optionally, the first feedback and the second feedback comprise a callback signal of the elevator controller.

A fixture configured to perform the above automatic configuration method of fixture, wherein the fixture is installed in an elevator button board or display.

An elevator comprising the above fixture.

The automatic configuration method of fixture, the fixture and the elevator of the present invention have the advantages of being simple and reliable, convenient to maintain and the like, and can automatically configure the fixture during installation and maintenance, effectively improving the user experience.

BRIEF DESCRIPTION OF THE DRAWINGS

The present invention will be further described in details below in conjunction with the accompanying drawings and the preferred embodiments, but those skilled in the art will appreciate that the figures are drawn for the purpose of explaining the preferred embodiments only and are therefore shall be taken as limiting the scope of the invention. In addition, unless specifically noted, the drawings are only intended to conceptually illustrate the composition or configuration of the described objects and may contain exaggerated illustration, and the drawings are not necessarily drawn in scale.

FIG. 1 is a flow diagram of one embodiment of an automatic configuration method of fixture for the present application.

DETAILED DESCRIPTION OF EMBODIMENT

Preferred embodiments of the present invention will be described in details below with reference to the accompanying drawings. It will be appreciated by those skilled in the art that these descriptions are merely descriptive, exemplary, and shall not be construed as limiting the claimed scope of the invention.

First, it should be noted that the orientation terms top, bottom, upward, downward, etc. referred to herein are defined relative to the directions in various drawings, these terms are relative concepts, and thus can vary depending on the different positions and the different practical positions in which they are located. Accordingly, these or other directional terms shall not be construed as limiting terms.

Furthermore, it should also be noted that, for any single technical feature described or implied in the embodiments herein or any single technical feature shown or implied in the drawings, it is still possible to continue combining these technical features (or equivalents thereof), so as to acquire other embodiments of the invention that are not directly mentioned herein.

It should be noted that like reference numerals refer to the same or substantially the same components in different drawings.

The present application provides an automatic configuration method of fixture, which comprises the following steps: S1: sending, by a fixture, a predetermined request toward a predetermined address to an elevator controller; S2: judging a control function corresponding to the predetermined address; and S3: configuring the fixture according to the control function corresponding to the predetermined address.

FIG. 1 is a flow diagram of one embodiment of an automatic configuration method of fixture of the present application. Wherein, in step S1, the fixture sends a predetermined request toward a predetermined address to an elevator controller. The predetermined address may be determined based on the configuration of the elevator controller and the control line. For example, existing elevator control lines generally employ a serial bus, and the elevator communication protocol generally employs a series of consecutive constant bits or addresses on the bus to communicate the call information, the addresses represented by the series of constant bits being the predetermined addresses. For example, in one embodiment, the predetermined address range includes at least 64 addresses that are set consecutively. All of the aforementioned predetermined address ranges may be determined according to the technical characteristics for a certain specific model of fixture, elevator controller, and communication line. Specifically, the predetermined address range may be a predetermined address segment, e.g. several consecutive addresses, or several discrete addresses, or a combination of consecutive addresses and discrete addresses.

The predetermined request includes a floor request signal, for example, that simulates requesting a car to ascend or descend to a different floor, and may also be a simulating call signal, or any other suitable elevator control signal.

In step S2 of the automatic configuration method of fixture, the control function corresponding to the predetermined address is judged according to the feedback provided by the elevator controller.

It is readily understood that the elevator controller is configured to return a corresponding feedback after receiving a predetermined request or call information. The feedback provided by the elevator controller includes a first feedback. In one embodiment, the first feedback is a first electrical level and is kept over a predetermined time. For example, if the address to which the call information is send corresponds to a certain floor, then the elevator controller will provide a feedback, i.e., the first feedback, to illuminates the button indicator corresponding to that floor. The first feedback is generally a first electrical level that lasts longer than a predetermined time, and the first electrical level generally lasts for over 2 seconds or 3 seconds.

In step 110, it is judged that whether the feedback of the elevator controller is the first feedback, and specifically, if the first feedback is a first electrical level and is kept over a predetermined time, then it is judged that the control function corresponding to the predetermined address is a call button interface, and it is further recorded in step 120.

Furthermore, when the car is in maintenance or installation and stops at the first floor, if the fixture sends a predetermined request toward the first address corresponding to the first floor, the elevator controller will provide a second feedback different from the first feedback. In one embodiment, the second feedback may be a signal that transitions from a first electrical level to a second electrical level, and duration of the first electrical level is shorter than the predetermined time. In the embodiment described above, after a predetermined request is sent successively to all addresses within a predetermined address range, an address generating a second feedback (the first floor where the car is currently located) and a number of addresses generating the first feedback (other floors) will be obtained. It is detected at step 111 that whether the feedback of the elevator controller is the second feedback, and it is further recorded at step 120. It may be determined by the record which predetermined address corresponds to the call button interface of the first floor where the car is currently located.

It will be readily understood that the first feedback and the second feedback described above include the callback signal from the elevator controller. While specific forms of the first feedback and the second feedback are described above, the first feedback and the second feedback may be of other forms that those skilled in the art may come up with or employ. Furthermore, the first feedback and the second feedback may also be analog signals or digital signals.

Furthermore, if the feedback of the elevator controller is neither the first feedback nor the second feedback, or the recording operation of step 120 has been completed, step 112 will be performed. Wherein the predetermined address is modified to the next one following the address to which the last predetermined request was send, and the process is performed again from step S1. The automatic configuration method of fixture according to the application will send a predetermined request successively to all addresses within a predetermined address range, so as to detect possibly existing call button interface within the whole predetermined address range.

According to the record results of steps 110 and 111, or according to the record results of step 110 alone, it may be judged that which predetermined addresses within the predetermined address range correspond to the call button interface of the elevator controller. For example, the final record result may be that a portion of the addresses within the predetermined address range correspond to the call button interface, and may also be that all addresses within the predetermined address range correspond to the call button interface. In addition, the address generating the second feedback may be located between other addresses generating the first feedback, or located at one of the two ends of the sequence of the address generating the first feedback. To summarize, the addresses generating the first feedback together with the addresses generating the second feedback constitute the group of addresses corresponding to the call button interface of the elevator controller.

In one embodiment of the present application, the fixture is of a physical IO type, i.e., it is provided with several floor call buttons, and several consecutive addresses within the predetermined address range are set at the elevator controller to provide a one-to-one correspondence with the floor call button from lower floor to higher floor successively. Thus, for such fixture, in step S3, the physical buttons of the fixture may be directly bound to the respective addresses. Specifically, the physical buttons of the fixture are respectively bound from the lower floor to the higher floor with the address judged as the call button interface from lower bit to higher bit.

In another embodiment of the present application, the fixture is of a non-physical IO type, i.e., it is not provided with one-to-one corresponding floor call buttons, but virtual buttons are required to be generated and presented to the user. In this case, the floor number of the floor corresponding to each address cannot be determined because the elevator may operate only within part of the section in the building, or the building is provided with basement structures of a different number of floors and the like.

Therefore, in case that the fixture is a non-physical IO type fixture, when it is judged in step 111 that the feedback of the elevator controller belongs to the second feedback, the specific floor number of the first floor is judged by reading the floor indication information. The floor indication information may be judged according to several information bits within the communication protocol or communication line, such as a dedicated position indicator bit or the like. After the floor number of the first floor is obtained, the floor number of the floors corresponding to other addresses can be judged successively. One possible method of judging is: the difference between the floor numbers of the first floor and other floors is equal to the difference between the address corresponding to the first floor and the addresses corresponding to other floors. Those skilled in the art may also judge the actual correspondence according to the specifications, and the scheme of the present application is not limited to the correspondence described above.

Optionally, a checking step 130 is further included, the checking step 130 comprises: predicting a second address corresponding to a second floor; moving the car to the second floor and sending a predetermined request to the elevator controller at the second address; detecting whether the feedback of the elevator controller is the second feedback. Specifically, the second address may be predicted according to the following steps: establishing a correspondence between each address and floor within a predetermined address range successively; locating a first address corresponding to the first floor; and predicting the second address according to a difference between the floor number of the first floor and the floor number of the second floor.

The checking step 130 may be performed for one or more times, for example, the checking step may be performed only with two adjacent floors, or the checking step may be performed with the floor corresponding to each address, respectively. The checking step facilitates to avoid the occurrence of inaccurate button-floor mapping relationships.

In the fixture of the non-physical IO type, virtual buttons are generated in step S3, wherein each virtual button is bound to an address judged as a call button interface respectively, and the virtual buttons are configured to display the floor number of each floor. For example, the fixture may provide with a touch screen and may receive input by a user pressing on various virtual buttons. The virtual buttons may have any suitable shapes, including, but not limited to, rectangular, circular, rounded rectangular, oval, etc., and the virtual buttons may be arranged in a grid.

In one embodiment of the present application, the fixture and elevator controller are connected by a serial bus. However, other communication line structures or other communication protocols may also be employed depending on the actual requirement.

The application also provides a fixture configured to perform the above automatic configuration method of fixture, wherein the fixture can be installed in an elevator button board or a display, and disposed in a car of the elevator.

When a fixture in the elevator needs to be installed or repaired and replaced, the automatic configuration method of fixture according to the present application is performed by connecting the fixture of the present application to the elevator communication line, and the fixture can automatically identify the call interface of the elevator controller, thereby automatically configuring physical buttons or generating virtual buttons. Therefore, the automatic configuration method of fixture and the fixture can reduce the address configuration operation required during elevator installation or maintenance and replacement, improving the user experience for elevator maintenance and installation.

This description discloses the present invention with reference to the accompanying drawings, and also enables those skilled in the art to practice the invention, including making and using any system or systems, selecting suitable materials, and using any incorporated elevators. The scope of the invention is defined by the claimed technical solutions, and contains other instances that occur to those skilled in the art. As long as such other instances include structural elements that are not different from the literal language of the claimed technical solutions, or such other instances contain equivalent structural elements without substantial differences from the literal language of the claimed technical solutions, such other instances should be considered to be within the scope determined by the claimed technical solution of the present invention.

What is claimed is:

1. An automatic configuration method of a fixture for an elevator, the method comprising:
S1: sending, by the fixture, a predetermined request toward a predetermined address range to an elevator controller;
wherein the predetermined request is sent to a portion or all addresses within the predetermined address range;
S2: judging a control function corresponding to the portion or all addresses of the predetermined address range according to feedback provided by the elevator controller;
wherein, whether the control function corresponding to each address of the portion or all addresses of the predetermined address range corresponds to a call button interface is judged according to the feedback signal provided by the elevator controller;
wherein the feedback signal provided by the elevator controller includes a first feedback, wherein the first feedback is a first electrical level and is kept over a predetermined time;
wherein, when the feedback signal provided by the elevator controller is the first feedback, the control function corresponding to each address is judged to correspond to the call button interface; and
S3: configuring the fixture according to the control function.

2. The automatic configuration method of fixture of claim 1, wherein the feedback provided by the elevator controller further comprises a second feedback, wherein the second feedback is a transition from the first electrical level to a second electrical level within a predetermined time.

3. The automatic configuration method of fixture of claim 2, wherein when the feedback provided by the elevator controller is the second feedback, the control function corresponding to a predetermined address of the portion or all addresses of the predetermined address range is judged to be a call button interface of the floor where the car is currently located.

4. The automatic configuration method of fixture of claim 1, wherein the fixture is of physical IO type.

5. The automatic configuration method of fixture of claim 4, wherein, in step S3, the physical buttons of the fixture are bound from lower floor to higher floor to addresses judged as call button interfaces from lower bit to higher bit.

6. The automatic configuration method of fixture of claim 1, wherein the fixture is of non-physical IO type.

7. The automatic configuration method of fixture of claim 6, further comprising: when the feedback provided by the elevator controller is the second feedback, judging the floor number of the first floor by detecting the floor indication information, and judging the floor number of the floor corresponding to other addresses.

8. The automatic configuration method of fixture of claim 7, wherein, in step S3, virtual buttons are generated, wherein each virtual button is bound to an address judged as a call button interface respectively, and the virtual buttons are configured to display the floor numbers of each floor.

9. The automatic configuration method of fixture of claim 1, wherein the predetermined request comprises a floor request signal.

10. The automatic configuration method of fixture of claim 1, wherein the fixture is connected to the elevator controller through a serial bus.

11. The automatic configuration method of fixture of claim 1, wherein the predetermined time is no less than 2 seconds.

12. The automatic configuration method of fixture of claim 1, wherein the predetermined address range comprises at least 64 addresses.

13. The automatic configuration method of fixture of claim 1, wherein the first feedback and the second feedback comprise a callback signal of the elevator controller.

14. A fixture configured to perform the automatic configuration method of a fixture according to claim 1, wherein the fixture is installed in an elevator button board or display.

15. An elevator comprising the fixture of claim 14.

16. An automatic configuration method of a fixture for an elevator, the method comprising:
S1: sending, by the fixture, a predetermined request toward a predetermined address range to an elevator controller, wherein predetermined requests are sent to a portion or all of addresses within a predetermined address range;
S2: judging a control function corresponding to a portion or all addresses of the predetermined address range; and
S3: configuring the fixture according to the control function corresponding to the portion or all addresses;
wherein in step S2, a control function corresponding to each address of the portion or all addresses of the predetermined address range is judged according to feedback provided by the elevator controller;
wherein the feedback provided by the elevator controller includes a first feedback, wherein the first feedback is a first electrical level and is kept over a predetermined time;
the method further comprising a checking step, the checking step comprises:
predicting a second address corresponding to a second floor;
moving the car to the second floor and sending the predetermined request to the elevator controller at the second address; and
judging whether the feedback of the elevator controller is the second feedback.

17. The automatic configuration method of fixture of claim 16, wherein the second address is predicted according to:
establishing a correspondence between the address and the floor;
locating the first address corresponding to the first floor; and
predicting the second address according to a difference between the floor numbers of the first floor and the floor numbers of the second floor.

* * * * *